(12) United States Patent
Kawazoe

(10) Patent No.: US 10,838,244 B2
(45) Date of Patent: Nov. 17, 2020

(54) DISPLAY

(71) Applicant: Mitsubishi Electric Corporation, Tokyo (JP)

(72) Inventor: Motomu Kawazoe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/504,073

(22) Filed: Jul. 5, 2019

(65) Prior Publication Data

US 2020/0033662 A1 Jan. 30, 2020

(30) Foreign Application Priority Data

Jul. 26, 2018 (JP) ................... 2018-140109

(51) Int. Cl.
| | |
|---|---|
| *G02F 1/1333* | (2006.01) |
| *G02F 1/1335* | (2006.01) |
| *G02F 1/1345* | (2006.01) |
| *G02F 1/13357* | (2006.01) |

(52) U.S. Cl.
CPC .... *G02F 1/133308* (2013.01); *G02F 1/13452* (2013.01); *G02F 1/133602* (2013.01); *G02F 2001/13332* (2013.01); *G02F 2001/133314* (2013.01); *G02F 2001/133317* (2013.01)

(58) Field of Classification Search
CPC ...... G09G 3/3611; G09G 3/3413; G09G 3/36; G09G 2320/0626
See application file for complete search history.

(56) References Cited

U.S. PATENT DOCUMENTS

| | | | |
|---|---|---|---|
| 2003/0169383 A1* | 9/2003 | Kim .................. | G02B 6/009 349/58 |
| 2013/0182412 A1* | 7/2013 | Choi ................. | G02F 1/133615 362/97.1 |
| 2016/0183387 A1* | 6/2016 | Tsunekawa ........... | H05K 1/181 361/749 |
| 2016/0377908 A1* | 12/2016 | Shin ................. | G02F 1/133308 349/58 |

FOREIGN PATENT DOCUMENTS

JP H05-071823 U 9/1993

* cited by examiner

*Primary Examiner* — Md Saiful A Siddiqui
(74) *Attorney, Agent, or Firm* — Studebaker & Brackett PC

(57) ABSTRACT

Provided is a display that facilitates assembly, and prevents breakage in its components resulting from their interference during the assembly. A display includes a shield cover that has a bottom portion and a side portion. The bottom portion is disposed over a circuit board. The side portion is continued to the bottom portion, and faces the outer surface of one side of the side portion of a middle frame. The side portion of the shield cover has an abutment portion protruding toward the middle frame side. The one side of the side portion of the middle frame has a butted portion that abuts on abutment portion. The shield cover and the middle frame are fixed to each other, by fitting the shield cover into the front frame with the abutment portion of the shield cover brought into abutment with the butted portion of the middle frame.

8 Claims, 11 Drawing Sheets

100

100

F I G. 6
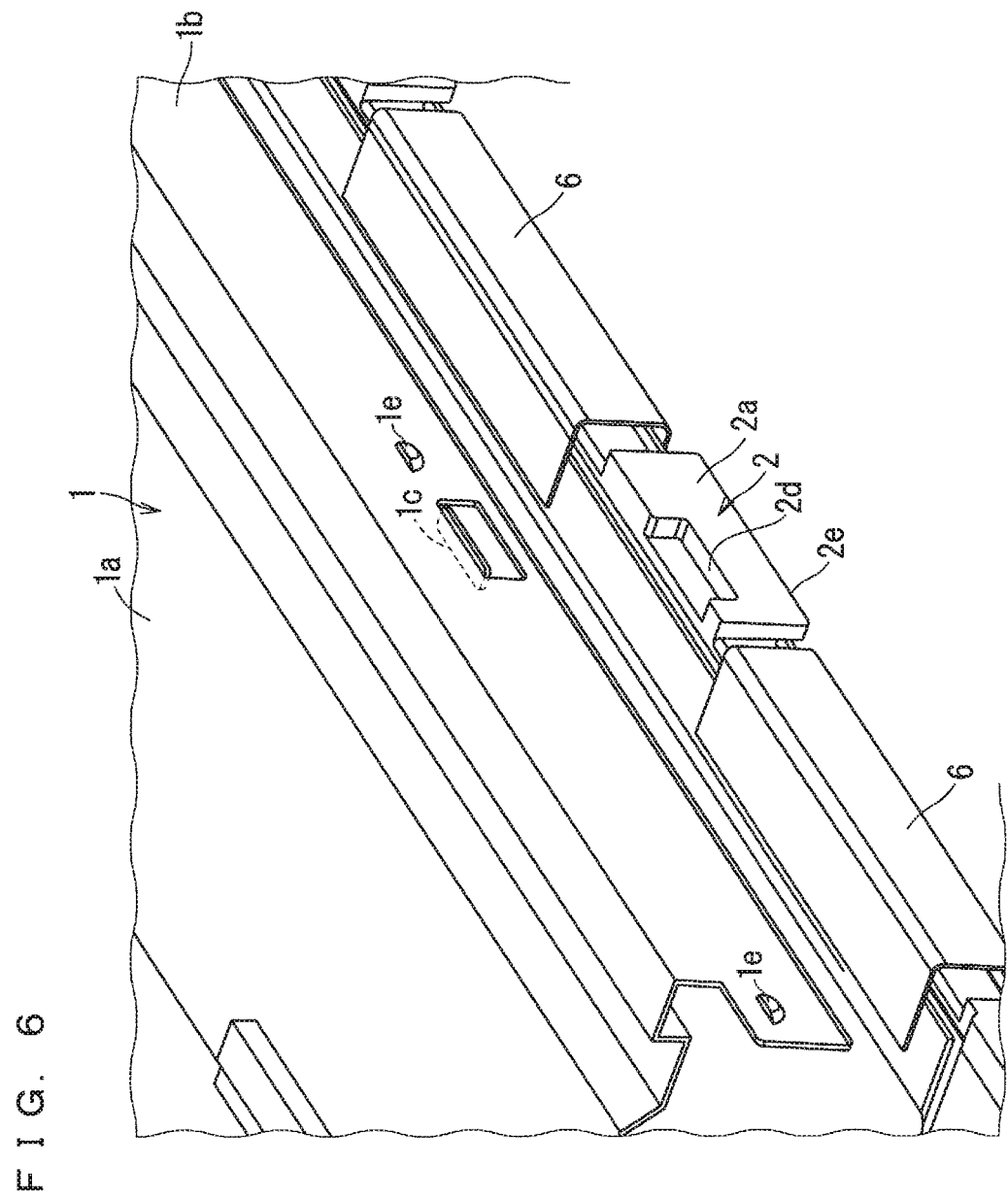

F I G. 7
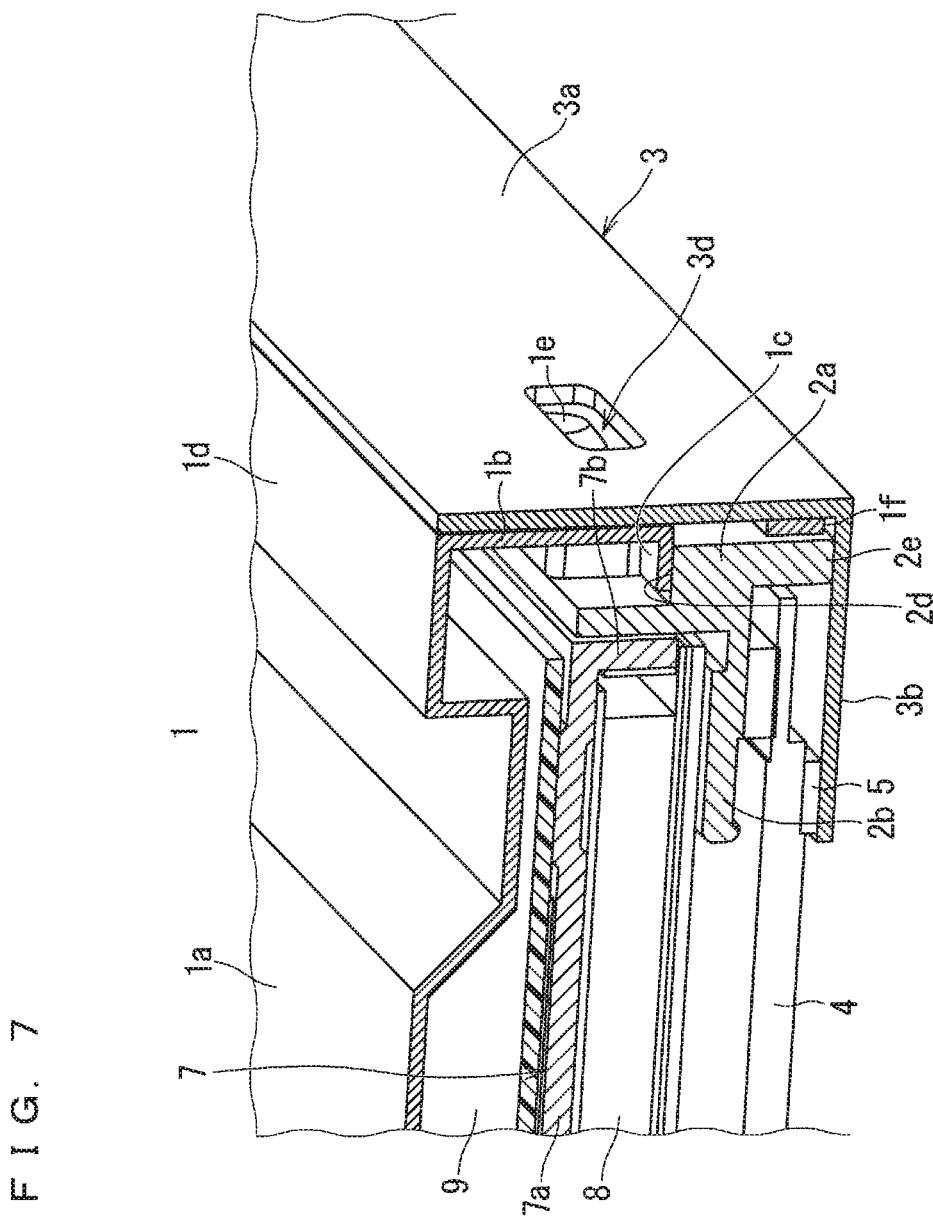

DISPLAY

BACKGROUND OF THE INTENTION

Field of the Invention

The present invention relates to a display that includes a display panel.

Description of the Background Art

A display includes a backlight that has an optical member held between a back frame and a middle frame. The display is fixed by a front frame, with a display panel facing the backlight. The display displays an image on the display surface of the display panel.

Some displays are structured through compression fixation. In this Specification, compression fixation is to fix fixation in the thickness direction through pressure application using a member of the display.

For instance, Japanese Utility Model Application Laid-Open No. 5-71823 discloses a structure that facilitates fixation with a fixing frame by forming the frame and a fixing member into an angular U-shape, and by placing a cushion between the display panel and a driver, so that a force acts on a direction in which the display panel and the driver are pushed out and fixed.

Unfortunately, the technique in Japanese Utility Model Application Laid-Open No. 5-71823, which discloses forming the frame and the fixing frame an angular U-shape, requires inserting of a module from the lateral direction, thus involving complicated assembly. For this reason, the components interfere with each other during assembly, thus causing breakage and other unfavorable results.

SUMMARY

It is an object of the present invention to provide a display that facilitates assembly, and prevents breakage in its components resulting from their interference during the assembly.

A display according to an aspect of the present invention includes a display panel and a backlight. The backlight is disposed to be opposite from the display surface of the display panel. The backlight irradiates the display panel with light. The backlight has a back frame and a middle frame. The back frame houses an optical member. The middle frame has a side portion disposed outside the side portion of the back frame. The display further includes a front frame, a circuit board, and a protective cover. The front frame has a side portion disposed outside the side portion of the backlight. The front frame unites the display panel and the backlight. The circuit board is disposed on a surface of the back frame, the surface being opposite from the display surface. The circuit board supplies a signal to the display panel. The protective cover protects the circuit board. The protective cover has a bottom portion and a side portion. The bottom portion is disposed over the circuit board. The side portion is disposed to be continued to the bottom portion, and faces the outer surface of one side of the side portion of the middle frame. The side portion of the protective cover has an abutment portion protruding toward the middle frame side. The one side of the side portion of the middle frame has a butted portion that abuts on the abutment portion. The protective cover and the middle frame are fixed to each other, by fitting the protective cover into the front frame with the abutment portion of the protective cover brought into abutment with the butted portion of the middle frame.

Such a configuration facilitates the assembly of the display, and prevents breakage in the components resulting from their interference.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an enlarged perspective view near a butted portion disposed between adjacent wiring members, which are included in the display;

FIG. 7 is a cross-sectional perspective view illustrating that the shield cover and a middle frame are fixed to each other by a front frame, all of which are included in the display;

DESCRIPTION OF THE PREFERRED EMBODIMENTS

Preferred Embodiment

Figure 1:
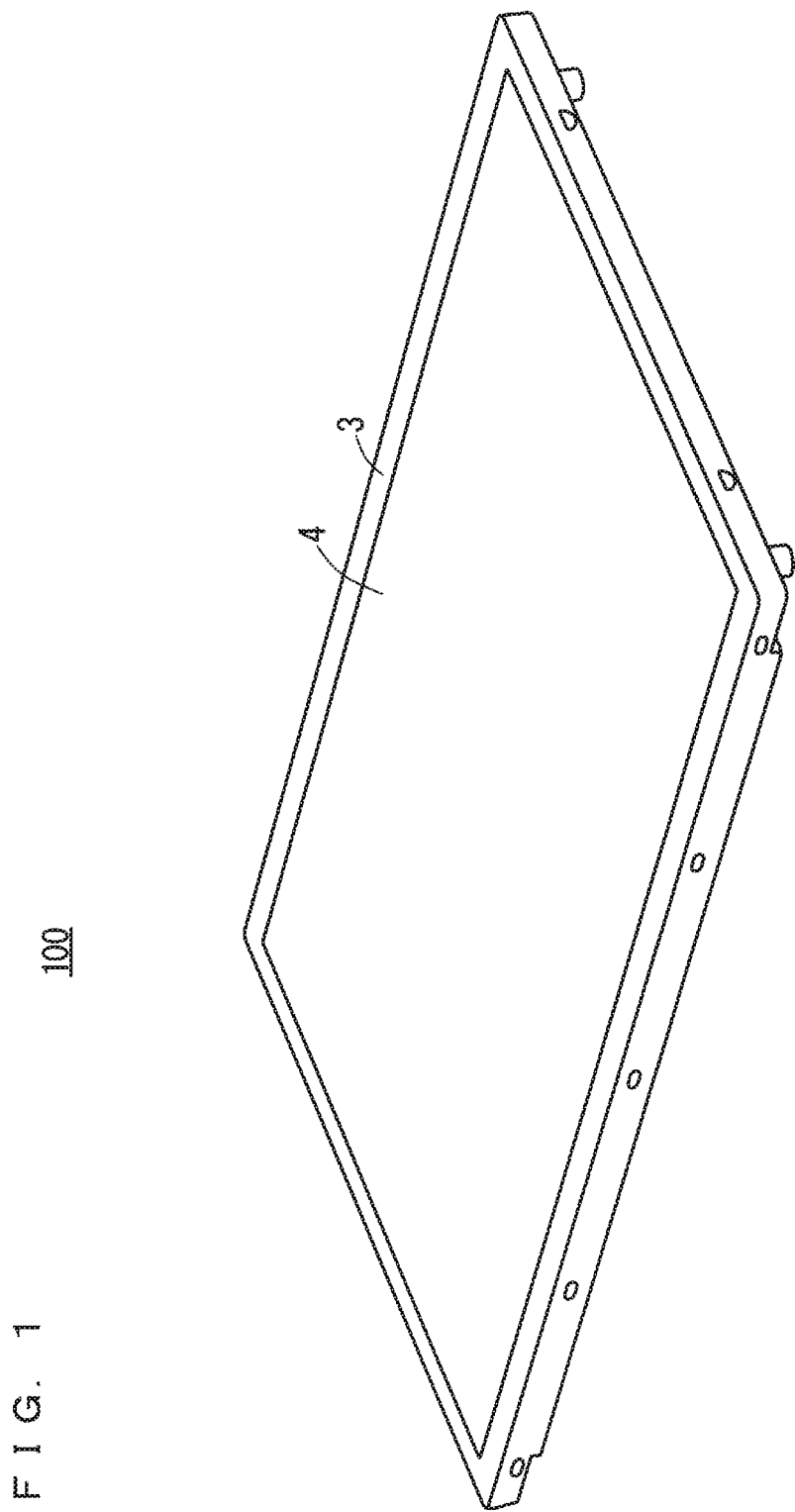
FIG. 1 is a perspective view of a display according to a preferred embodiment.
Figure 2:
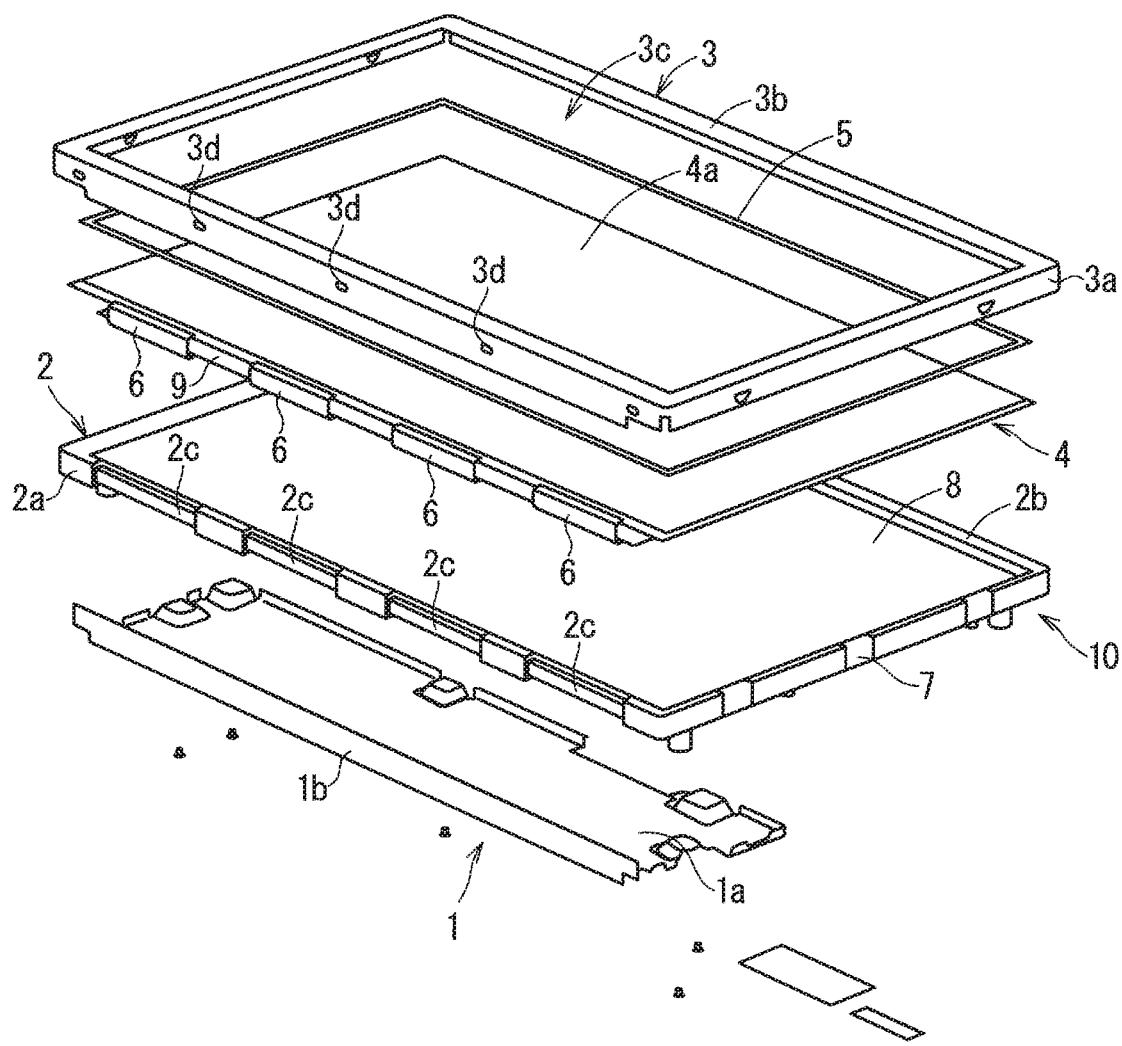
FIG. 2 is an exploded perspective view of the display.
Figure 3:
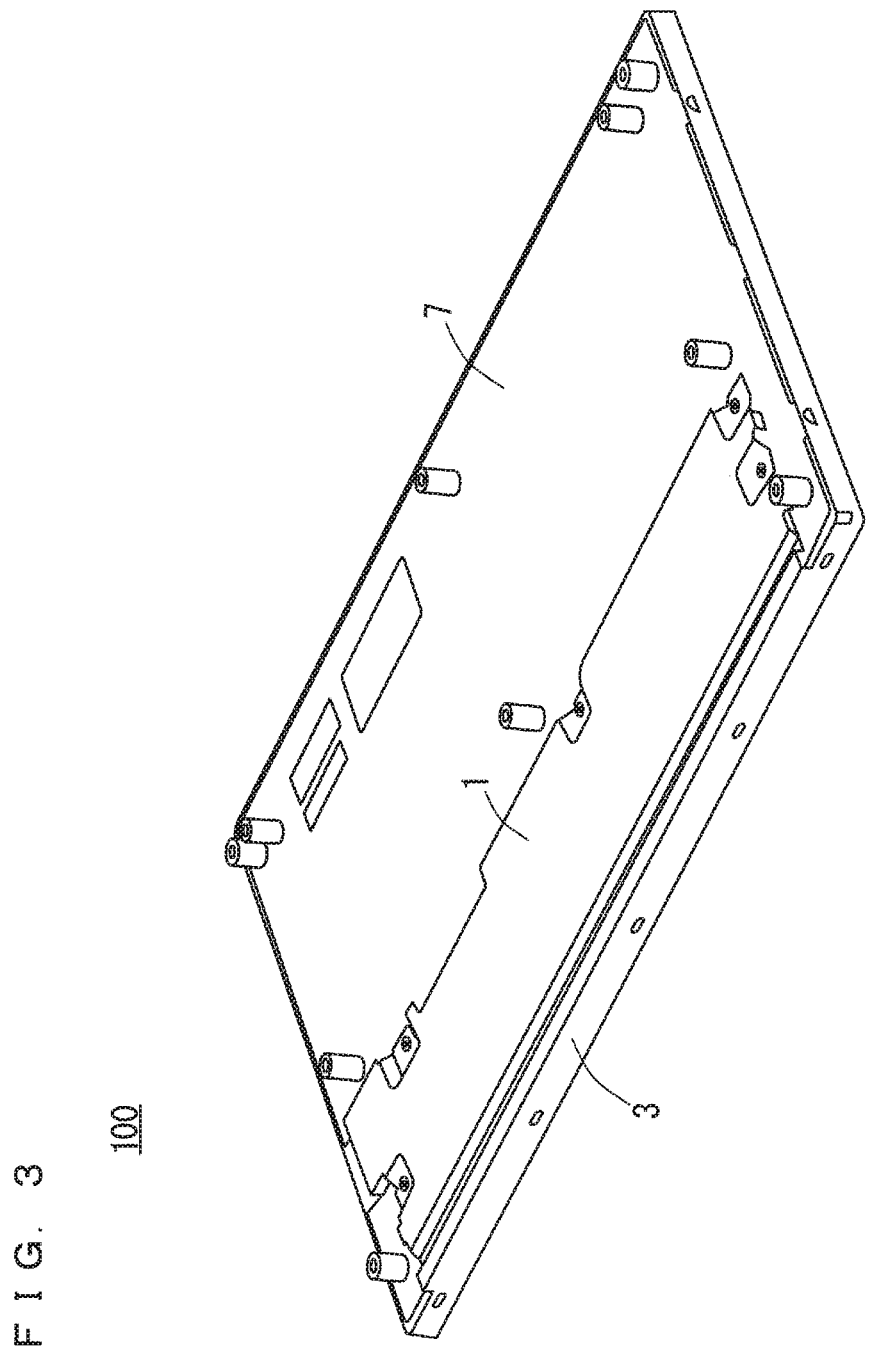
FIG. 3 is a perspective view of the display viewed from the opposite of its display surface.
Figure 4:
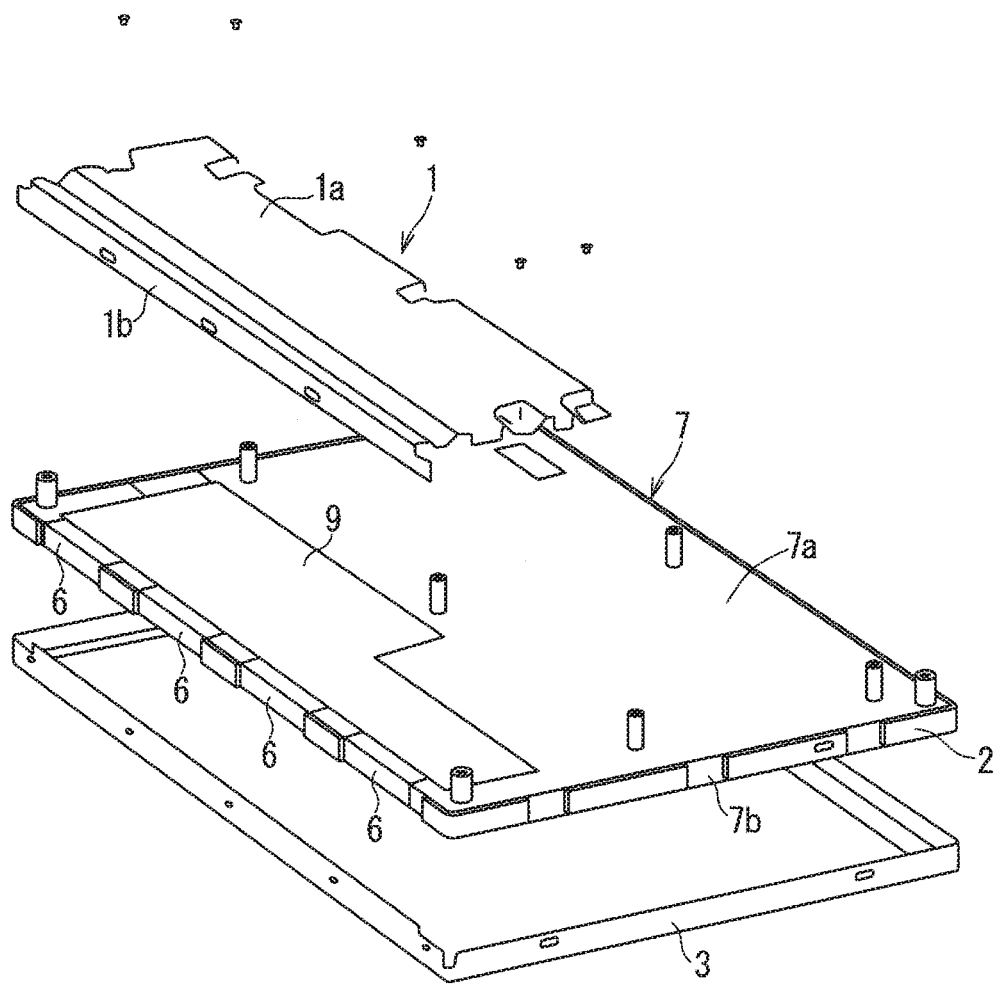
FIG. 4 is an exploded perspective view of the display viewed from the opposite of the display surface.

The following describes a preferred embodiment of the present invention with reference to the drawings. FIG. 1 is a perspective view of a display 100 according to the preferred embodiment. FIG. 2 is an exploded perspective view of the display 100. FIG. 3 is a perspective view of the display 100 viewed from the opposite of its display surface. FIG. 4 is an exploded perspective view of the display 100 viewed from the opposite of the display surface.

As illustrated in FIGS. 1 to 4, the display 100 includes a display panel 4, a backlight 10, a front frame 3, cushion tape 5, a plurality of wiring members (e.g., flexible printed circuits or FPCs for short) 6, a circuit board 9, and a shield cover 1, which is a protective cover.

The display panel 4 has a glass substrate and a counter substrate each provided with wires and electrodes. These substrates are placed in parallel, between which liquid crystals are held. Each substrate has a polarizer attached to its surface. The display region of the display panel 4 is composed of many pixels. Each pixel receives a signal in conformance with an image to be displayed, thus displaying the image.

The backlight 10 is disposed to be opposite from a display surface 4a of the display panel 4. The backlight 10 irradiates the display panel 4 with light. The backlight 10 includes a light source (not shown), an optical member 8, a back frame 7, and a middle frame 2. The back frame 7 is disposed to be opposite from the display surface 4a of the display panel 4. The back frame 7 has a bottom portion 7a, and four side portions 7b that are continued to the bottom portion 7a. The back frame 7 houses the optical member 8, such as an optical sheet.

The middle frame 2 is rectangular, and has a side portion 2a and an inner-perimeter portion 2b. The side portion 2a is disposed outside the side portions 7b of the back frame 7, that is, on the periphery of the back frame 7. The inner-perimeter portion 2b protrudes inward all around, from the side portion 2a. The inner-perimeter portion 2b of the middle frame 2 holds, from the display surface 4a side, the back frame 7 via the optical member 8 and others. The side portion 2a of the middle frame 2 holds the side portion 7b of the back frame 7 from the outside, that is, from the periphery of the back frame 7.

The front frame 3 is rectangular, and has a side portion 3a, a frame portion 3b, and an opening 3c. The side portion 3a is disposed outside the side portion of the backlight 10, that is, on the periphery of the backlight 10. The frame portion 3b protrudes inward all around, from the side portion 3a. The opening 3c faces the display surface 4a of the display panel 4. The front frame 3 is fixed to the backlight 10, thus uniting the display panel 4 and the backlight 10. The side portion 3a is rectangular, and has one side provided with a plurality of hole portions 3d. The hole portions 3d extend from the outer perimeter of the side through the inner perimeter of the side, and are spaced at regular intervals. The other sides of the side portion 3a have a plurality of hole portions extending from their outer perimeters through their inner perimeters. The back frame 7 has a plurality of nail portions disposed in its side portions 7b. These nails are fitted in the respective hole portions on the other sides of the side portion 3a, thus fixing the front frame 3 and the back frame 7 to each other.

The cushion tape 5 is dustproof and waterproof, and is disposed between the front frame 3 and the display panel 4. As illustrated in FIG. 4, the circuit board 9 is disposed on a surface of the back frame 7, the surface being opposite from the display surface 4a. The circuit board 9 supplies a signal to the display panel 4 to drive the display panel 4. The shield cover 1 is disposed on a surface of the circuit board 9, the surface being opposite from the display surface 4a. The shield cover 1 protects the circuit board 9.

Figure 5:
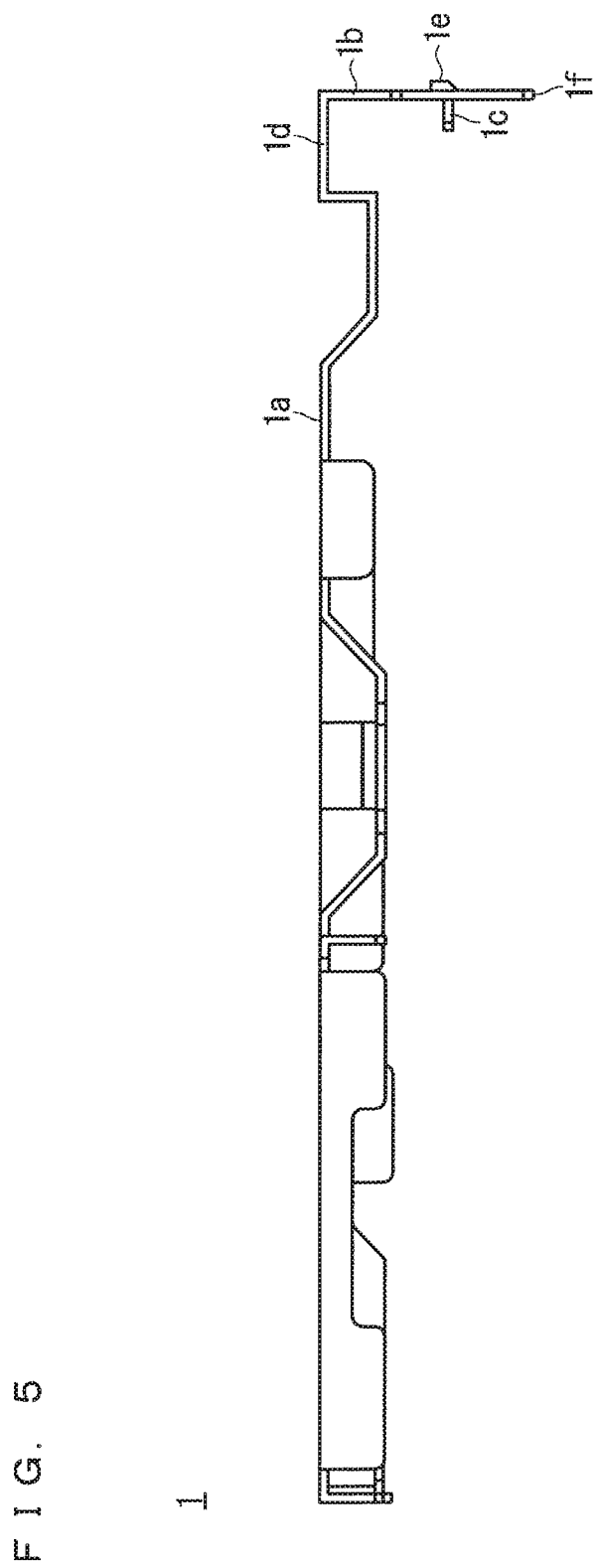
FIG. 5 is a plan view of a shield cover, which is included in the display.
Figure 8:
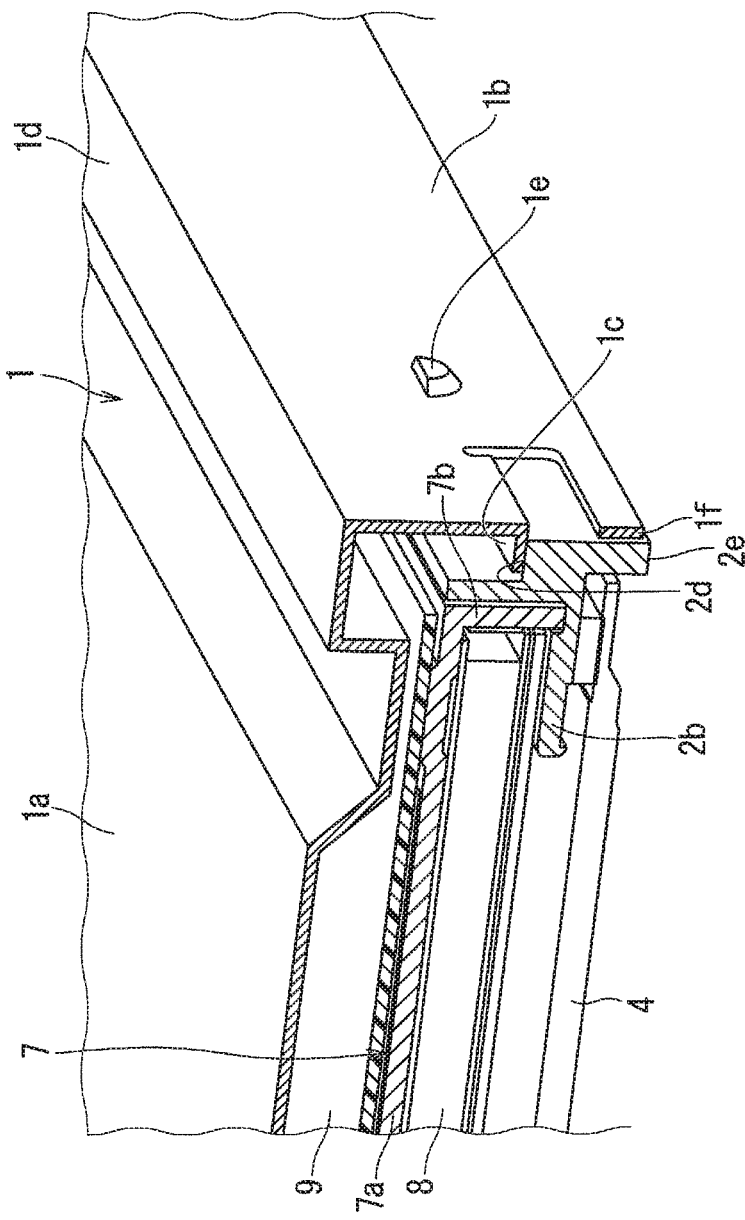
FIG. 8 is a cross-sectional perspective view illustrating the abutment between the shield cover and the middle frame of the display.

The following details each component of the display 100. FIG. 5 is a plan view of the shield cover 1 of the display 100. FIG. 6 is an enlarged perspective view near a butted portion 2d disposed between the adjacent wiring members 6 of the display 100. FIG. 7 is a cross-sectional perspective view illustrating that the shield cover 1 and the middle frame 2 are fixed to each other by the front frame 3, all of which are included in the display 100. FIG. 8 is a cross-sectional perspective view illustrating the abutment between the shield cover 1 and the middle frame 2 of the display 100.

Reference is made to the circuit board 9. As illustrated in FIGS. 2 and 4, the circuit board 9 controls the display panel 4 and the light source, using an electric input-and-output signal. The circuit board 9 is made of epoxy glass and other materials provided with a copper pattern. The circuit board 9 has a surface on which electronic components are soldered. The circuit board 9 is fixed to the surface of the back frame 7, the surface being opposite from the display surface 4a.

Reference is made to the middle frame 2. As illustrated in FIGS. 2 and 4, the middle frame 2 has the rectangular side portion 2a. The rectangular side portion 2a has one side provided with a plurality of dent portions 2c that are dented inward and are spaced at regular intervals. As illustrated in FIG. 6, the side of the rectangular side portion 2a has the butted portions 2d that extends in regions provided with no dent portions 2c except their corner portions. The butted portions 2d are disposed on the outer perimeter at an end portion of the middle frame 2, the end portion being opposite from the display surface 4a. The butted portions 2 are dented toward the display surface 4a side.

Reference is made to the wiring members 6. As illustrated in FIGS. 2 and 4, the wiring members 6, each consisting of wire-installed base material on a film, are used to connect the circuit board 9 to the display panel 4. The wiring members 6 each have one end portion connected to a wiring portion that is disposed outside the pixel region of the display panel 4. The other end portion of the wiring member 6 is connected to the joint portion of the circuit board 9. Accordingly, the signal from the circuit board 9 is input to the display panel 4. The wiring members 6 are disposed so as to face the side portion 2a of the middle frame 2, which holds the optical member 8. The side portion 2a of the middle frame 2 has the hollow portions 2c, where the wiring members 6 are placed. The wiring members 6 are disposed, the position of which depends on the hollow portions 2c.

Reference is made to the shield cover 1. As illustrated in FIGS. 2 to 5, the shield cover 1 is a cover protecting the circuit board 9 from external pressure and static electricity. The shield cover 1 is a metal plate (e.g., an aluminum steel plate, stainless steel plate, or a zinc-plated steel plate), or a thin resin film (e.g., a film of polyethylene terephthalate or PET for short). In the preferred embodiment, the shield cover 1 is made of a material including metal. In order to avoid electric contact with the circuit board 9 and the electronic components on the circuit board 9, the shield cover 1 desirably has a resin sheet (e.g., a PET sheet) attached on its surface adjacent to the circuit board 9, so as to be insulating.

The shield cover 1 has a bottom portion 1a and a side portion 1b. The bottom portion 1a covers the circuit board 9, which is fixed to the back frame 7. The side portion 1b is continued to the bottom portion 1a. The side portion 1b of the shield cover 1 extends toward the display surface 4a side. The side portion 1b faces the outer surface of one side of the side portion 2a of the middle frame 2. This side of the side portion 2a of the middle frame 2 is a side on which the dent portions 2c and the butted portions 2d are disposed.

As illustrated in FIG. 8, the shield cover 1 has abutment portions 1c. The abutment portions 1c are disposed at the center portion in the height direction of the side portion 1b; that is, the abutment portions 1c are disposed at locations of the side portion 1b facing the butted portion 2d of the middle frame 2. The abutment portions 1c protrude toward the middle frame 2 side, more specifically, inward. The wiring members 6 are arranged in the middle frame 2, and each abutment portion 1c is disposed between the adjacent wiring members 6. The side portion 1b is cut and folded inward to be partly bent inward, thus forming each abutment portion 1c. The abutment portion 1c and the side portion 1b form an L-shape.

The abutment portion 1c of the shield cover 1 has a surface adjacent to the display surface 4a. This adjacent surface abuts on a surface of the butted portion 2d of the middle frame 2, the surface of the butted portion 2d being opposite from the display surface 4a. Such a structure allows the middle frame 2 to bear a force that acts on the shield cover 1 during compression fixation.

As illustrated in FIGS. 7 and 8, part of the side portion 1b and of the bottom portion 1a forms an angular-U-shape portion 1d that is continued to the abutment portion 1c of the shield cover 1. The shield cover 1, which has the angular-U-shape portion 1d, is rigid against a force in the thickness direction of the display 100 that acts on the shield cover 1 through the compression fixation.

The side portion 1b of the shield cover 1 has nail portions 1e fitted in the respective hole portions 3d of the front frame 3. More specifically, the nail portions 1e protrude toward the outside of the side portion 1b, that is, outward; in addition, the nail portions 1e are disposed on the outer surface of the side portion 1b near the abutment portion 1c. The shield cover 1 and the middle frame 2 are fixed to each other, by fitting each nail portion 1e of the shield cover 1 into the corresponding hole portion 3d of the front frame 3 with each abutment portion 1e of the shield cover 1 brought into abutment with the corresponding butted portion 2d of the middle frame 2. The shield cover 1 and the front frame 3 can be fitted into each other. In such a case, the front frame 3 may have, instead of the hole portion 3d, nail portions (not shown) protruding inward, and the shield cover 1 may have hole portions (not shown) that corresponds to the respective nail portions.

Figure 9:
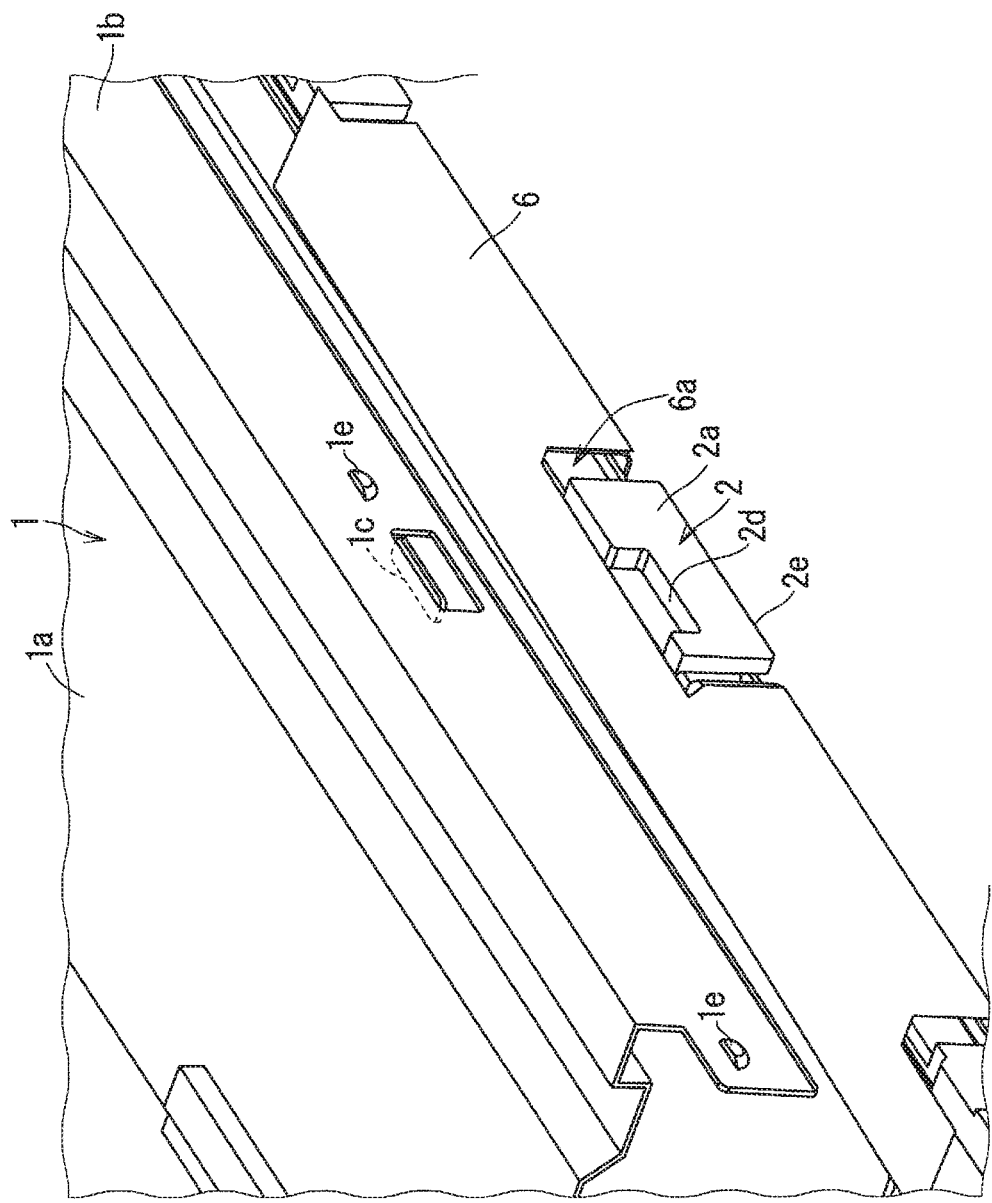
FIG. 9 is an enlarged perspective view near the butted portion disposed in a cutout hole of a long wiring member, which is included in the display.

It is noted that, as illustrated in FIG. 9, the wiring member 6 may have such a long length as to extend through one side of the side portion 2a of the middle frame 2. Such a long wiring member 6 partly has cutout holes 6a, in which the respective abutment portions 1c are disposed. This allows the abutment portions 1c of the shield cover 1 to abut on the respective butted portions 2d of the middle frame 2. FIG. 9 is an enlarged perspective view near the butted portion 2d disposed in the cutout hole 6a of the long wiring member 6 of the display 100.

Reference is made to FIG. 7. The side portion 2a of the middle frame 2 has an end portion 2e opposite the butted portion 2d. The end portion 2e abuts on the inner surface of the frame portion 3b of the front frame 3. Further, the bottom portion 1a of the shield cover 1 is adjacent to the bottom portion 7a of the back frame 7 via the circuit board 9. Still further, the abutment portion 1c of the shield cover 1 abuts on the butted portion 2d of the middle frame 2. Yet further, the nail portion 1e of the shield cover 1 is fitted in the hole portion 3d of the front frame 3. Accordingly, the shield cover 1 and the middle frame 2 are fixed to each other so as to sandwich the abutment portions 1c of the shield cover 1 and the butted portions 2d of the middle frame 2 through pressure application.

Still yet further, as illustrated in FIG. 7, the side portion 1b of the shield cover 1 has an extremity portion 1f. The extremity portion 1f is disposed in such a location as not to abut on the inner surface of the frame portion 3b of the front frame 3 when the display 100 is assembled. That is, the extremity portion 1f of the side portion 1b of the shield cover 1 is disposed between the butted portion 2d and the end portion 2e of the middle frame 2.

If the extremity portion 1f of the side portion 1b of the shield cover 1 abutted on the inner surface of the frame portion 3b of the front frame 3, the front frame 3 would be pushed depending on variations in the manufacture of the shield cover 1. This unfavorable situation would involve variable distance between the front frame 3 and the display panel 4.

To address this problem, the display according to the preferred embodiment is structured in such a manner that the extremity portions if of the side portion 1b of the shield cover 1 do not abut on the inner surface of the frame portion 3b of the front frame 3, and that the abutment portions 1c of the shield cover 1 abut on the respective butted portions 2d of the middle frame 2. Such a structure keeps the distance between the front frame 3 and the display panel 4 uniform during the compression fixation.

With the pressure generated by the compression fixation, the distance between the display panel 4 and the front frame 3 is insusceptible to variation. This enables the cushion tape 5 between the display panel 4 and the front frame 3 to exert its stable performance for fixation.

As described above, the display 100 according to the preferred embodiment includes the shield cover 1. The shield cover 1 has the bottom portion 1a and the side portion 1b. The bottom portion 1a is disposed over the circuit board 9. The side portion 1b is continued to the bottom portion 1a, and faces the outer surface of one side of the side portion 2a of the middle frame 2. The side portion 1b of the shield cover 1 has the abutment portion 1e protruding toward the middle frame 2 side. The butted portion 2d that abuts on the abutment portion is disposed on the side of the side portion 2a of the middle frame 2. The hole portion 3d is disposed in the side portion 3a of the front frame 3. The nail portion 1e fitted in the hole portion 3d is disposed in the side portion 1b of the shield cover 1. The shield cover 1 and the middle frame 2 are fixed to each other, by fitting the nail portion 1e of the shield cover 1 into the hole portion 3d of the front frame 3 with the abutment portion 1c of the shield cover 1 brought into abutment with the butted portion 2d of the middle frame 2.

Accordingly, the shield cover 1 is attached to the middle flame 2, which is included in the backlight 10; in addition, the front frame 3 is attached to the shield cover 1. The shield cover 1 and the backlight 10 are thus fixed to each other. Such a configuration facilitates the assembly of the display 100, and prevents breakage resulting from the interference of the components during the assembly. The improvement in the assembly allows the display 100 to be assembled with high precision.

The abutment portion 1c, together with the side portion 1b of the shield cover 1, forms an L-shape. The abutment portion 1e, which is formed by cutting and inward folding the side portion 1b for instance, is provided in a simple manner.

As illustrated in FIG. 6, the display 100 further includes the plurality of wiring members 6 disposed on one side of the side portion of the circuit board 9, and connecting the display panel 4 and the circuit board 9 to each other. The abutment portion 1c is disposed between the adjacent wiring members 6. Such a configuration avoids contact between the abutment portion 1c and the wiring member 6.

As illustrated in FIG. 9, the display 100 further includes the long wiring member 6 disposed on one side of the side portion of the circuit board 9, and connecting the display panel 4 and the circuit board 9 to each other. The abutment portion 1c is disposed in the cutout hole 6a of the wiring member 6. For the display 100 that includes the long wiring member 6, such a configuration avoids contact between the abutment portion 1c and the long wiring member 6.

<Modifications of Preferred Embodiment>

Figure 10:
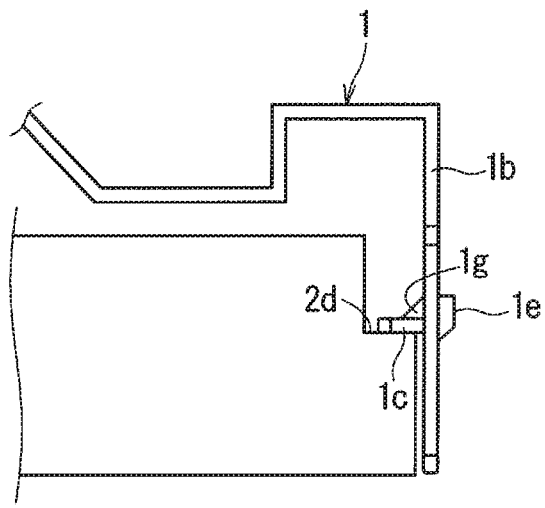
FIG. 10 is a diagram for describing the abutment between the abutment portion of the shield cover and the butted portion of the middle frame, which are included in a display according to a first modification of the preferred embodiment.
Figure 11:
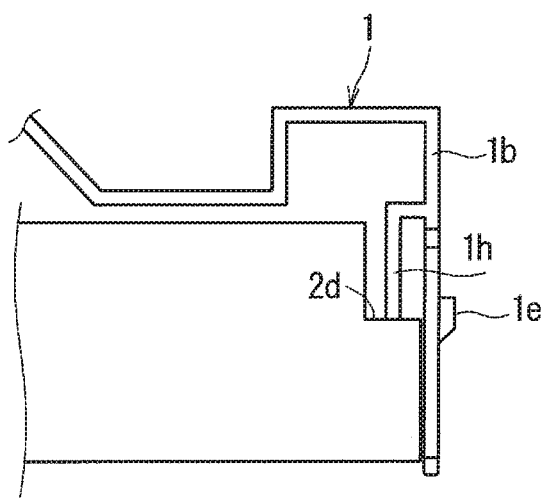
FIG. 11 is a diagram for describing the abutment between the abutment portion of the shield cover and the butted portion of the middle frame, which are included in a display according to a second modification of the preferred embodiment.
Figure 12:
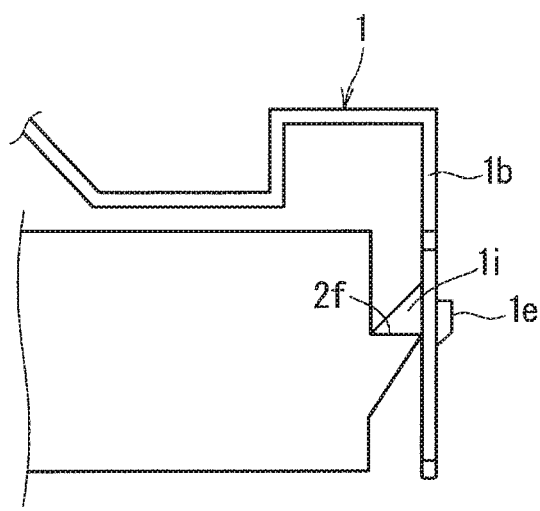
FIG. 12 is a diagram for describing the abutment between the abutment portion of the shield cover and the butted portion of the middle frame, which are included in a display according to a third modification of the preferred embodiment.

The following describes first to third modifications of the preferred embodiment. FIG. 10 is a diagram for describing the abutment between the abutment portion 1c of the shield cover 1 and the butted portion 2d of the middle frame 2. The shield cover 1 and the middle frame 2 are included in the display 100 according to the first embodiment of the preferred embodiment. FIG. 11 is a diagram for describing the abutment between an abutment portion 1h of the shield cover 1 and the butted portion 2d of the middle frame 2. The shield cover 1 and the middle frame 2 are included in the display 100 according to the second embodiment of the preferred embodiment. FIG. 12 is a diagram for describing the abutment between an abutment portion 1i of the shield cover 1 and the butted portion 2d of the middle frame 2. The shield cover 1 and the middle frame 2 are included in the display 100 according to the third embodiment of the preferred embodiment. In FIGS. 10 to 12, the components other than the shield cover 1 are simplified for illustration.

As illustrated in FIG. 10, the shield cover 1 may have ribs 1g disposed in its side portion 1b. The ribs 1g reinforce the abutment portions 1c. The rib 1g a member connecting the two sides of the L-shape, is fixed at the joint portion between the two sides. That is, the rib 1g is fixed to a surface of the abutment portion 1c opposite from the surface where the butted portion 2d abuts, and to the inner surface of the side portion 1b. Alternatively, cutting and inward folding the side portion 1b can form the rib 1g. In this case, the site where the rib 1g is formed, is seen as a groove when viewed from outside. The ribs 1g, reinforcing the abutment portions 1c, are disposed at the side portion 1b of the shield cover 1. This improves the strength of the abutment portions 1c.

Alternatively, as illustrated in FIG. 11, the shield cover 1 may have, instead of the abutment portions 1c, the abutment portions 1h extending from the side portion 1b of the shield cover 1 toward the middle frame 2 side, and being bent toward the butted portions 2d side. Such a configuration enables more precise positioning than positioning in the case of the L-shape, when the abutment portion 1h is brought into abutment with the butted portion 2d.

Alternatively, as illustrated in FIG. 12, the shield cover 1 may have, instead of the abutment portions 1e, the abutment portions 1i tapered toward their extremities side. In this case, the middle frame 2 may have, instead of the butted portions 2d, butted portions 2f tapered toward the side portions 1b side of the shield cover 1. Such a configuration achieves the abutment portions 1i of high strength.

As described above, the abutment portion can be shaped into various forms that do not change the dimension of the shield cover 1 for assembly, during compression fixation, and that are rigid enough to be supported by the butted portion. For instance, an L-shaped fitting or a member (e.g., block) may be screwed or welded onto the side portion 1b of the shield cover 1, thus forming an abutment portion. Here, the butted portion of the middle frame 2 can be also shaped into various forms in conformance with the shape of the abutment portion of the shield cover 1.

It is noted that in the present invention, the preferred embodiment can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
   a display panel; and
   a backlight disposed to be opposite from a display surface of the display panel, the backlight being configured to irradiate the display panel with light,
   the backlight including
      a back frame that houses an optical member, and
      a middle frame that has a side portion disposed outside a side portion of the back frame,
   the display device further comprising:
   a front frame that has a side portion disposed outside a side portion of the backlight, the front frame uniting the display panel and the backlight;
   a circuit board disposed on a surface of the back frame, the surface being opposite from the display surface, the circuit board being configured to supply a signal to the display panel; and
   a protective cover protecting the circuit board,
   the protective cover having
      a bottom portion disposed over the circuit board, and
      a side portion disposed to be continued to the bottom portion, the side portion facing an outer surface of one side of the side portion of the middle frame,
   the side portion of the protective cover having an abutment portion protruding toward the middle frame side,
   the one side of the side portion of the middle frame having a butted portion that abuts on the abutment portion, and
   the protective cover and the middle frame being fixed to each other, by fitting the protective cover into the front frame with the abutment portion of the protective cover brought into abutment with the butted portion of the middle frame.

2. The display device according to claim 1, wherein
   the front frame has a hole portion or a nail portion,
   the protective cover has a nail portion fitted in the hole portion of the front frame, or has a hole portion fitted in the nail portion of the front frame, and
   the protective cover and the middle frame are fixed to each other, by fitting the nail portion of the protective cover into the hole portion of the front frame, or by fitting the hole portion of the protective cover into the nail portion of the front frame, with the abutment portion of the protective cover brought into abutment with the butted portion of the middle frame.

3. The display device according to claim 1, further comprising a plurality of wiring members disposed on one side of a side portion of the circuit board, the plurality of wiring members connecting the display panel and the circuit board to each other,
   wherein the abutment portion is disposed between the plurality of wiring members adjacent to each other.

4. The display device according to claim 1, further comprising a long wiring member disposed on one side of a side portion of the circuit board, the long wiring member connecting the display panel and the circuit board to each other,
   wherein the abutment portion is disposed in a cutout hole disposed in the long wiring member.

5. The display device according to claim 1, wherein
   the butted portion is disposed at an end portion of the middle frame, the end portion being opposite from the display surface,
   the butted portion is dented toward the display surface side, the abutment portion extends from the side portion of the protective cover toward the middle frame side, and the abutment portion is bent toward the butted portion side.

6. The display device according to claim 1, wherein the abutment portion is tapered.

7. The display device according to claim 1, wherein the abutment portion, together with the side portion of the protective cover, forms an L-shape.

8. The display device according to claim 7, wherein the side portion of the protective cover has a rib that reinforces the abutment portion.

* * * * *